United States Patent
Pao et al.

(10) Patent No.: US 8,369,398 B2
(45) Date of Patent: Feb. 5, 2013

(54) APPARATUS AND METHOD THEREOF FOR ENCODING/DECODING VIDEO

(75) Inventors: I-Ming Pao, Shulin (TW); Song Jin, San Jose, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 1353 days.

(21) Appl. No.: 12/044,932

(22) Filed: Mar. 8, 2008

(65) Prior Publication Data

US 2008/0219357 A1    Sep. 11, 2008

Related U.S. Application Data

(60) Provisional application No. 60/893,626, filed on Mar. 8, 2007.

(51) Int. Cl.
   *H04N 11/02* (2006.01)
(52) U.S. Cl. .................................. 375/240.05
(58) Field of Classification Search ............. 375/240.02, 375/240.03, 240.05
   See application file for complete search history.

(56) References Cited

U.S. PATENT DOCUMENTS

| | | | |
|---|---|---|---|
| 5,896,099 A | 4/1999 | Yamauchi | |
| 6,310,915 B1 * | 10/2001 | Wells et al. | 375/240.03 |
| 6,690,726 B1 | 2/2004 | Yavits et al. | |
| 2004/0264577 A1 * | 12/2004 | Jung | 375/240.24 |
| 2005/0031032 A1 * | 2/2005 | Shen et al. | 375/240.01 |
| 2005/0100231 A1 * | 5/2005 | Wang et al. | 382/236 |
| 2008/0025412 A1 * | 1/2008 | Lee et al. | 375/240.25 |

OTHER PUBLICATIONS

Feng-Ming Wang, "High-Quality coding of the Even Fields Based on the Odd Fields of Interlaced Video Sequences," Jan. 1991, IEEE Transactions on Circuits and Systems, vol. 38, No. 1, p. 140-142.*
Won Rak Sung, "Adaptive Motion Estimation Technique for Motion Compensated Interframe Interpolation," Jun. 1999, IEEE Transactions on Consumer Electronics, vol. 45, Issue 3, pp. 753-761.*

* cited by examiner

*Primary Examiner* — Dang Ton
*Assistant Examiner* — Ryan Kavleski
(74) *Attorney, Agent, or Firm* — McClure, Qualey & Rodack, LLP

(57) ABSTRACT

An apparatus and method for encoding/decoding an input video complied with a fixed frame rate standard and adjusting bit-stream of an encoded/decoded video in real-time. The apparatus comprises a video encoder, a control circuit, an interface, and a buffer. The control circuit is used for monitoring the utility status of the buffer and thereby controlling the operation of the video encoder to achieve real-time adjustable time-varying throughput for various transmission environments.

22 Claims, 3 Drawing Sheets

APPARATUS AND METHOD THEREOF FOR ENCODING/DECODING VIDEO

CROSS REFERENCE TO RELATED APPLICATIONS

This application claims the benefit of U.S. Provisional Application No. 60/893,626, filed on Mar. 8, 2007 and entitled "APPARATUS AND METHOD THEREOF FOR ENCODING/DECODING VIDEO", the contents of which are incorporated herein by reference.

BACKGROUND OF THE INVENTION

1. Field of the Invention

The present invention relates to video technology, and in particular, relates to an apparatus for video encoding/decoding.

2. Description of the Prior Art

Digital video applications are commonplace in everyday life. Many video compression techniques and related standards are created to reduce the demand for the bandwidth of data transmission and the space for data storage, such as MPEG-1, MPEG-2, and MPEG-4, which are applied to multimedia, and H.263, which is applied to video conference. For instance, the frame rate of MPEG-1 is fixed, and the frame rate of MPEG-2 applied to DVD is also fixed, i.e. 29.97 frames per second. The frame rate of other video standards, such as MPEG-4 and H.263, are variable, that is, the frame rate can be adjusted during encoding process. The video compression techniques establish data blocks by discrete cosine transformation (DCT), motion compensation (MC), quantification, and variable length coding (VLC). The above-mentioned techniques are well known to those skilled in the art, the detailed descriptions are omitted.

Video bit-stream is generated in applications of video encoder for video transmission according to channel rate, and is transmitted to video decoder by network. In addition, Video bit-stream is generated in applications of video encoder for storing data according to the storage space, such as hard disk, and is loaded into the storage space, such as hard disk, by a writing/reading scheme of the storage space. Refer to FIG. 1. FIG. 1 shows a block diagram of the conventional apparatus for encoding/encoding video.

However, video packets are often lost because of transmission channel congestion, the lack of storage space, or busy storage equipment (i.e. apparent decade of write rate for hard disk due to densely segmenting) in practice. The conventional methods cannot adjust throughput in real-time, such that video data are lost to result in unacceptable video quality accordingly. And also, the conventional method under standards with a fixed frame rate cannot adjust bit-stream in real-time, such that video packets are lost to result in unacceptable video quality.

Therefore, it is important to provide a method with real-time bit-stream adjustment, which follows fixed or variable frame rate video standards, such that unacceptable video quality resulted from the loss of video data, non-smooth previous video playback, jumpy motion of video frame, etc., is improved.

SUMMARY OF THE INVENTION

One objective of the present invention is to provide an apparatus with variable frame rate applied to video bit-stream encoding, and the compression standard adopt by the apparatus is still under a fixed frame rate.

One objective of the present invention is to provide a better video bit-stream by emulating skipped frames in video bit-stream.

One objective of the present invention is to provide a video apparatus for encoding/decoding video and a method thereof, such that video bit-stream can be adjusted to solve the above-mentioned problems.

Herein, no matter what specification or standard is adopt by network structure, storage device, or video standard, the present invention can therefore solve the above-mentioned problems to improve the video quality greatly. As mentioned above, it is apparent that the present invention is a novel invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
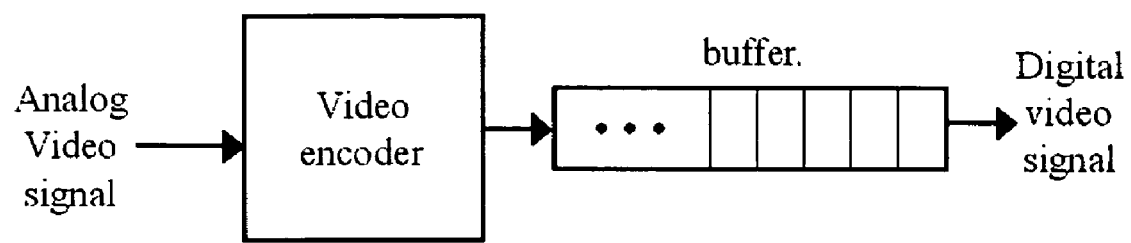
FIG. 1 is a diagram of a conventional video apparatus.
Figure 2:
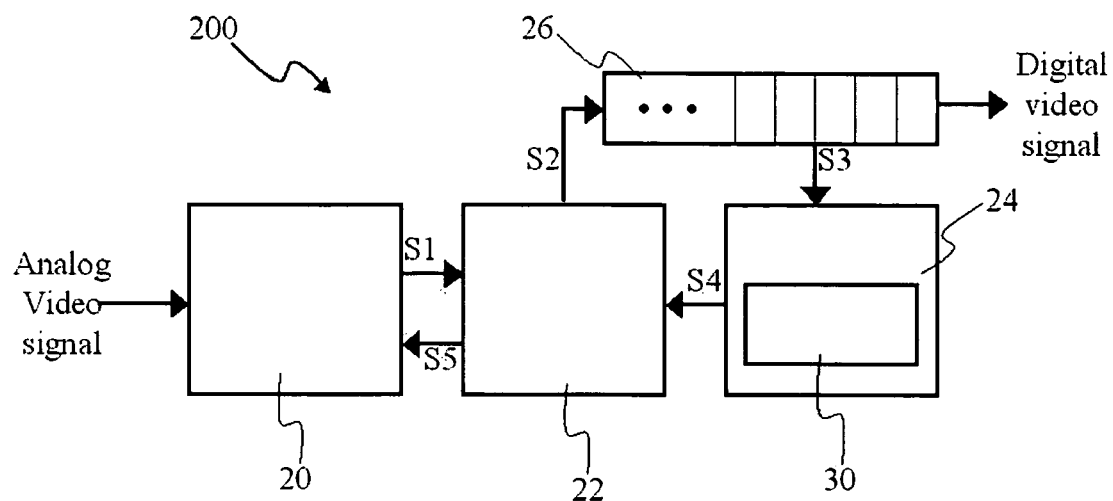
FIG. 2 is a diagram illustrating a video apparatus for encoding/decoding video according to one embodiment of the present invention.

Refer to FIG. 2. FIG. 2 is a diagram illustrating a video apparatus for encoding/decoding video according to one embodiment of the present invention. As shown in FIG. 2, an apparatus for encoding/decoding video 200 comprises a pre-processing circuit 20, video encoder 22, a control circuit 24, a buffer 26, and an interface 28 (not shown). The interface 28 is an interface (e.g. SATA, IDE, and SCSI) coupled to a hard disk if the apparatus for encoding/decoding video 200 is coupled to a storage device (e.g. a hard disk). The interface 28 is a network transceiver (e.g. a wireless transceiver or a wired transceiver) if the apparatus for encoding/decoding video 200 is coupled to a device with a network interface, wherein the wireless transceiver follows 3G standard, WiMax standard (i.e. IEEE 802.16x), WLAN standard (i.e. WiFi standard, such as IEEE 802.11a, IEEE 802.11b, IEEE 802.11g, and IEEE 802.11n), and the wired transceiver follows related network standard, such as IEEE 802.3. Certainly, the interface 28 can comprise a network transceiver and a hard disk interface in the mean time.

The control circuit 24 comprises a detecting unit 30, a first threshold value, and a second threshold value. The detecting unit 30 is utilized to judge the utility status of the buffer 26 (i.e. the capacity of the buffer 26). The buffer 26 will overflow resulted from transmission channel congestion or busy storage device while the data amount of the buffer 26 exceeds the first threshold value, thus, the throughput of the video data outputted by the video encoder 22 should be decreased so as to avoid the video data loss. The buffer 26 will have an underflow resulted from unobstructed transmission channel or available storage equipment while the data amount of the buffer 26 is below the second threshold value, thus, the throughput of bit-stream outputted by the video encoder 22 should be increased or adjusted to a previous setting in order to present a better video quality. A signal $S_3$ in FIG. 2 presents the utility status of the buffer 26, and the control circuit 24 knows the utility status of the buffer 26 by the signal $S_3$. In one embodiment, the signal $S_3$ presents values of a write pointer and a read pointer in the buffer 26. The detecting unit 30 (e.g. a subtractor) determines the data amount of the buffer 26 by computing the values of the write pointer and the read pointer in the buffer 26. In another embodiment, the detecting unit 30 comprises a counter for computing the data amount of the buffer 26. The control circuit 24 further comprises a comparator for comparing a signal (i.e. the data amount of the buffer 26) outputted by the detecting unit 30 with a relation between the first threshold value (i.e. overflow) and the second threshold value (i.e. underflow) to output an adjusting signal $S_4$ to the video encoder 22.

The control circuit 24 informs the video encoder 22 by the adjusting signal $S_4$ to adjust encoding operation (e.g. adjustment in compression ratio) in order to meet the demand for the storage space of the buffer 26. In addition, the buffer 26 will overflow while the control circuit 24 detects a abnormal state in the current throughput resulted from a broken transmission channel or a busy storage device, and the control circuit 24 pauses the operation of the video encoder 22 to avoid data loss. In other words, the video encoder 22 decides how to encode the video data (e.g. stop compressing, start to compress, adjust compression ratio) according to the adjusting signal $S_4$ from the control circuit 24.

The video encoder 22 decreases the throughput while the data amount of the buffer 26 will exceed or already exceeds the overflow threshold value. In another embodiment, the pre-processing circuit 20 comprises a low-pass filter and performs a low-pass filtering process on the input video signal according to a second adjusting signal $S_5$ or the adjusting signal $S_4$. The pre-processing unit 20 performs an intensive low-pass filtering process on the input video signal to increase compression ratio while the second adjusting signal $S_5$ or the adjusting signal $S_4$ indicates transmission channel congestion, that is, there are a better effect on compression and a less compressed data amount while there is less high frequency portion of the input video signal. In addition, the pre-processing circuit 20 further performs a noise detecting and filtering process by hardware, software, or both of them with various noise filtering scheme (e.g. sliding window scheme for each frame or switching scheme for establishing noise pattern to different channel signal).

In another embodiment, the pre-processing circuit 20 can decrease the throughput to the video encoder 22, that is, the pre-processing circuit 20 performs a skipping and replacing process on the input video signal for field while the pre-processing circuit 20 is informed to decrease the throughput. For example, the pre-processing circuit 20 can transmit a frame with even and odd fields or a frame with a single field, wherein the field in the frame with a single field is processed by interpolation to generate another field so as for replacing the skipped field, and then, the field generated by interpolation is combined with the single field in the frame with a single field to form a whole new frame. And, the pre-processing unit 20 performs related pre-processing operation on the input video signal to decrease the throughput to the video encoder 22. Accordingly, the video encoder 22 has a better encoding efficiency without obvious debasement for video quality. Certainly, this scheme can avoid packet loss while transmission channel is congested or broken.

The video encode 22 receives a pre-processing signal $S_1$ (i.e. the input video signal processed by pre-processing operation) and the adjusting signal $S_4$ and generates an encoded signal $S_2$ and the second adjusting signal $S_5$. The video encoder 22 generates a second adjusting signal $S_5$ according to the adjusting signal $S_4$, and informs the pre-processing circuit 20 by the adjusting signal $S_4$ or the second adjusting signal $S_5$ to dynamically adjust the processes on the input video signal. The video encoder 22 adjusts the encoding scheme in real-time according to the adjusting signal $S_4$ to generate the encoded video signal $S_2$. In another embodiment, the encoding scheme of the video encoder 22 is proceeded according to video standards by increasing/decreasing/replacing frames, increasing or decreasing the sampling/quantization order, or others which can change throughput. Thus, the throughput can be adjusted in real-time under a fixed or a variable frame rate video standard in order to overcome the limit of throughput due to transmission channel congestion or the lack of the storage space.

Figure 3:
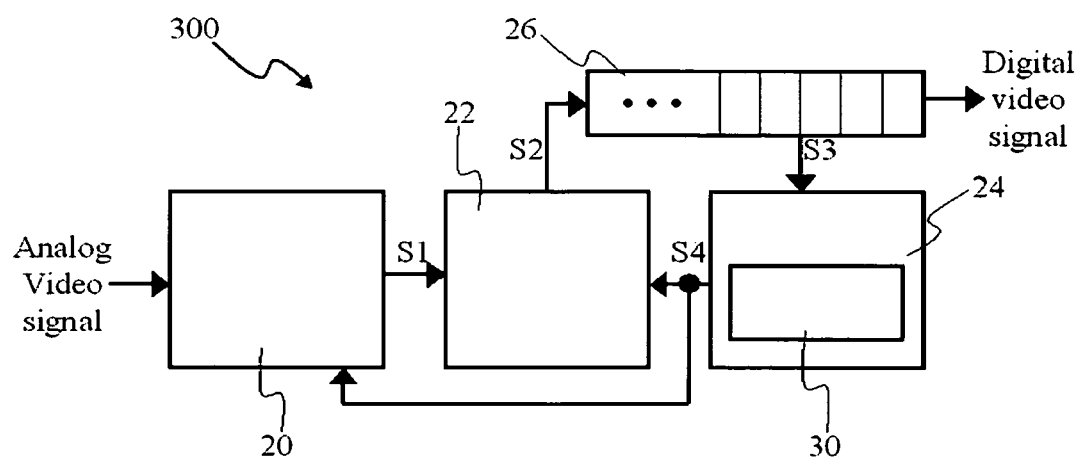
FIG. 3 is a diagram illustrating a video apparatus for encoding/decoding video according to another embodiment of the present invention.

As mentioned above, the pre-processing circuit 20 adjusts the processes on the input video signal according to the adjusting signal $S_4$. Refer to FIG. 3. FIG. 3 is a diagram illustrating a video apparatus for encoding/decoding video according to another embodiment of the present invention, wherein the pre-processing circuit 20 can be omitted.

Figure 4:
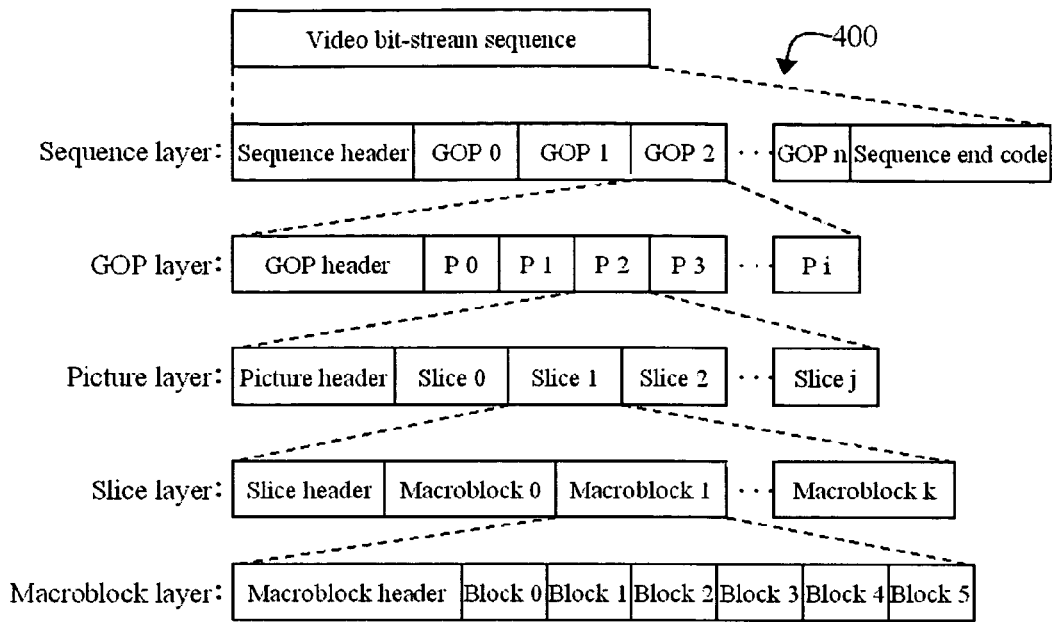
FIG. 4 is a structure of a video bit-stream sequence under MPEG-2 standard.

Refer to FIG. 4. FIG. 4 shows a structure of a video bit-stream sequence under MPEG-2 standard, and MPEG-2 is a fixed frame rate video standard. A video bit-stream sequence following MPEG-2 video standard consists of a sequence header, a plurality of group of pictures (GOP), and a sequence end code. Each GOP consists of a GOP header, a plurality of Intra frames (notated as I-frame as follows), a plurality of Predictable frames (notated as P-frame as follows), and a plurality of Bi-directional predictable frames (notated as B-frame as follows). I-frame is key frame, which is a still frame generated by a discrete cosine transformation, that is, I-frame is not generated by any prediction scheme with other frames. P-frame is generated by a single directional prediction scheme with a past I-frame or a predictive P-frame. B-frame is generated by a bi-directional prediction scheme with a past I-frame and a future predictive P-frame, or a past predictive P-frame and a future predictive P-frame. Accordingly, the data amount of I-frame is the largest among I-frame, P-frame, and B-frame, i.e. the compression ratio of I-frame is the least, and the data amount of B-frame is the least among I-frame, P-frame, and B-frame, i.e. the compression ratio of B-frame is the largest. Each frame consists of a frame header and a plurality of slices. Each slice consists of a slice header and a plurality of macroblocks. Each macroblock consists of a macroblock header and six blocks. Herein, please note the difference among I-frame, P-frame, and B-frame so as to understand the following description for techniques adopt by an embodiment of the present invention.

Figure 5A:
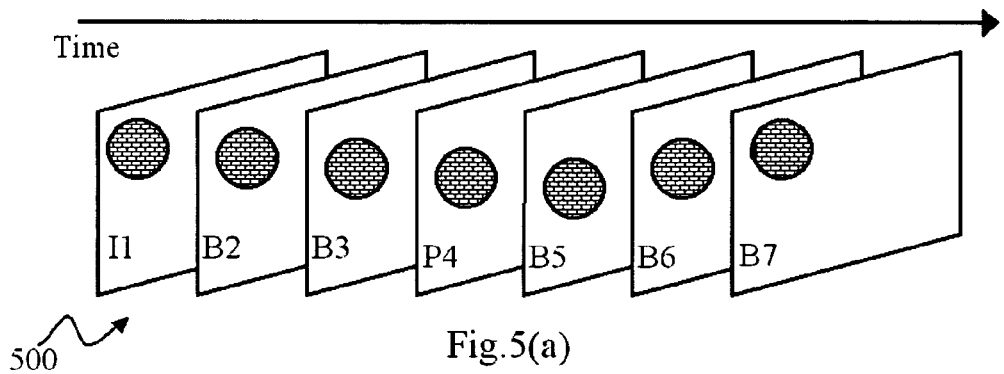
FIG. 5 (*a*) and FIG. 5 (*b*) show a method for encoding/decoding video according to one embodiment of the present invention.
Figure 5B:
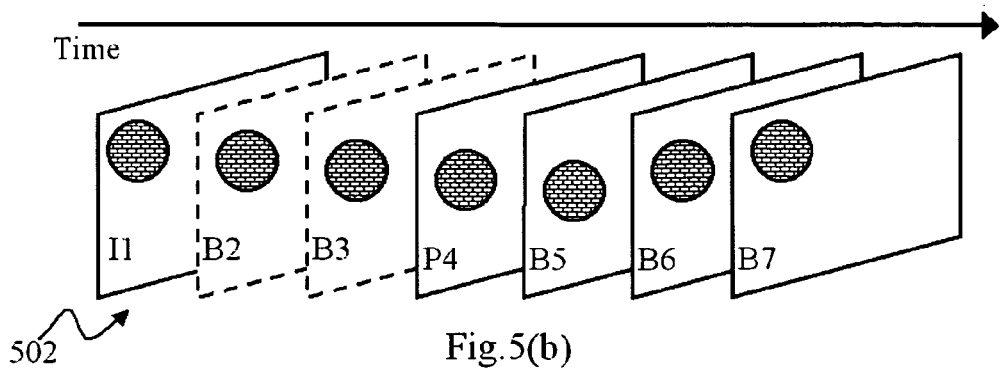

Refer to FIG. 5 (a) and FIG. 5 (b). FIG. 5 (a) and FIG. 5 (b) show a method for encoding/decoding video according to one embodiment of the present invention. Here, MPEG-2 video standard is taken as an embodiment for explaining the present invention, and the present invention is also suitable for other video standards. For MPEG-2 video standard, the video encoder 22 or the pre-processing circuit 20 can replace unnecessary frame (e.g. B-frame or/and P-frame) with other frames in order to meet video standard and the demand for dynamic bit-stream adjustment while encoding. FIG. 5 (a) shows whole frames before skipping frames, and FIG. 5 (b) shows remaining frames after skipping frames according a preferred embodiment of the present invention. In a preferred embodiment, B-frames are skipped firstly, and P-frames are skipped secondly, wherein those skipped frames are replaced with frames generated by interpolation or reserved to meet MPEG-2 video standard. Therefore, the present invention adjusts data amount of transmitting frame dynamically according to the throughput of transmission channel under a fixed frame rate video standard, such that the problems (e.g. the lack of storage space, overflow, transmission channel congestion, and broken channel) are all resolved.

Those skilled in the art will readily observe that numerous modifications and alterations of the device and method may be made while retaining the teachings of the invention Accordingly, the above disclosure should be construed as limited only by the metes and bounds of the appended claims.

What is claimed is:

1. An apparatus for encoding/decoding video, comprising:
    a pre-processing circuit for receiving an input video signal and a first adjusting signal, the pre-processing circuit performing a skipping and replacing process on the input video signal according to the first adjusting signal for decreasing the throughput of the input video signal, the pre-processing circuit providing a pre-processed video signal;
    a video encoder, coupled to the pre-processing circuit, for receiving the pre-processed video signal and a second adjusting signal to encode the pre-processed video signal to generate an encoded video signal according to the second adjusting signal, wherein the data amount of the encoded video signal corresponds to the second adjusting signal;
    a buffer, coupled to the video encoder, for storing the encoded video signal;
    an interface, coupled to the buffer, for outputting the encoded video signal stored in the buffer; and
    a control circuit, coupled to the buffer, for generating the first adjusting signal according to a utility status of a storage space of the buffer;
    wherein the skipping and replacing process comprises skipping one of an even field or odd field of frames of the input video signal and replacing the skipped field with the other field in the same frame.

2. The apparatus of claim 1, wherein the control circuit further comprises:
    a detecting unit for determining the utility status of the storage space of the buffer according to a write pointer and a read pointer of the buffer.

3. The apparatus of claim 2, wherein the control circuit has a first threshold value and a second threshold value, and the detecting unit outputs the first adjusting signal and second adjusting signal according to the utility status of the storage space, the first threshold value, and the second threshold value.

4. The apparatus of claim 1,
    wherein the pre-processing circuit comprises a low-pass filter, wherein the low-pass filter performs a low-pass filtering process on the input video signal.

5. The apparatus of claim 4, wherein the low-pass filter has a filtering characteristic and adjusts the filtering characteristic of the low-pass filter according to the first adjusting signal.

6. The apparatus of claim 1, wherein the input video signal comprises at least one first frame and a plurality of second frames, the first frame is a frame processed by a discrete cosine transform (DCT), the plurality of second frames are frames generated by other frames, and at least one of the plurality of second frames is skipped and replaced firstly while the skipping and replacing process is executing.

7. The apparatus of claim 1,
    wherein the pre-processing circuit is further configured for performing a noise detecting and filtering process on the input video signal.

8. The apparatus of claim 1, wherein the input video signal complies with a fixed frame rate video standard.

9. The apparatus of claim 8, wherein the fixed frame rate video standard is MPEG-1 video standard or MPEG-2 video standard.

10. The apparatus of claim 1, wherein the input video signal complies with MPEG-4 video standard or H.263 video standard.

11. The apparatus of claim 1, wherein the video encoder adjusts a quantization order according to the second adjusting signal and encodes the pre-processed video signal according to the quantization order.

12. The apparatus of claim 1, wherein the interface comprises at least one of a network interface and an interface for a storage unit.

13. A method for processing an input video signal, comprising:
    receiving the input video signal; performing a skipping and replacing process on the input video signal according to a first adjusting signal for decreasing the throughput of the input video signal, and providing a pre-processed video signal;
    encoding the pre-processed video signal according to a second adjusting signal to generate an encoded video signal, wherein the data amount of the encoded video signal corresponds to the second adjusting signal;
    storing the encoded video signal in a storage unit;
    outputting the encoded video signal via an interface; and
    detecting a utility status of the storage space of the storage unit, and outputting the first adjusting signal according to the utility status of the storage space of the storage unit;
    wherein the skipping and replacing process comprises skipping one of an even field or odd field of frames of the input video signal and replacing the skipped field with the other field in the same frame.

14. The method of claim 13, wherein the step of encoding the pre-processed video signal further comprising:
    performing a low-pass filtering process on the pre-processed video signal.

15. The method of claim 14, wherein the input video signal comprises at least one first frame and a plurality of second frames, the first frame is a frame processed by a discrete cosine transformation, the plurality of second frames are frames generated by other frames, wherein at least one of the plurality of second frames is replaced while the skipping and replacing process is executing.

16. The method of claim 13, wherein the step of encoding the pre-processed video signal further comprising:
    adjusting a quantization order of encoding the pre-processed video signal according to the second adjusting signal.

17. The method of claim 14, further comprising:
    preventing overflow or underflow of the storage unit according to the first adjusting signal and second adjusting signal.

18. The method of claim 13, wherein the utility status of the storage space of the storage unit is detected according to a write pointer and a read pointer of the storage unit.

19. The method of claim 13, wherein the input video signal complies with a fixed frame rate video standard.

20. The method of claim 19, wherein the fixed frame rate video standard is MPEG-1 video standard or MPEG-2 video standard.

21. The method of claim 13, wherein the interface comprises a network transceiver.

22. The method of claim 13, wherein the input video signal complies with MPEG-4 video standard or H.263 video standard.

* * * * *